United States Patent [19]

Hagerman et al.

[11] Patent Number: 4,823,224
[45] Date of Patent: Apr. 18, 1989

[54] RAPID PRESSURE RISE CIRCUIT

[75] Inventors: Richard E. Hagerman, Penfield; Joseph F. Foster, Fairport, both of N.Y.

[73] Assignee: Qualitrol Corporation, Fairport, N.Y.

[21] Appl. No.: 146,376

[22] Filed: Jan. 21, 1988

[51] Int. Cl.$^4$ ............................................. H02H 7/04
[52] U.S. Cl. .................................. 361/37; 361/110; 307/118; 340/626
[58] Field of Search ............... 361/35, 36, 37, 38, 361/45, 110, 157, 187, 195, 93, 100, 102, 111, 89, 94, 115, 116, 117, 272; 307/118; 73/208, 209; 340/626, 646

[56] References Cited

U.S. PATENT DOCUMENTS

| | | | |
|---|---|---|---|
| 3,914,667 | 10/1975 | Waldron | 361/110 X |
| 4,001,644 | 1/1977 | Lingenfelter et al. | 361/37 |
| 4,218,216 | 8/1980 | Narbus | 361/37 |
| 4,297,241 | 10/1981 | Howell | 361/93 |
| 4,297,738 | 10/1981 | Lee | 361/42 |
| 4,376,243 | 3/1983 | Renn et al. | 219/514 |
| 4,441,056 | 4/1984 | Siglock | 361/35 X |
| 4,644,439 | 2/1987 | Taarning | 361/87 |
| 4,654,806 | 3/1987 | Poyser et al. | 364/551 |

Primary Examiner—A. D. Pellinen
Assistant Examiner—David Osborn
Attorney, Agent, or Firm—Charles L. Johnson, Jr.

[57] ABSTRACT

An electronic relay control circuit is provided for liquid cooled electric power transformers. The control circuit senses the rate of change of internal tank pressure and operates its relays in response to a sudden pressure increase. Relay control connections are provided for operating transformer trip and annunciator circuits. The relay response is field adjustable.

5 Claims, 3 Drawing Sheets

RAPID PRESSURE RISE CIRCUIT

BACKGROUND OF THE INVENTION

A. Field of the Invention

A rapid pressure rise relay is a device used on liquid cooled electric power transformers, to detect excessive rates of pressure rise within the tank as a result of internal arcing. This arcing occurs because of faults such as winding insulation breakdown. The output of the rapid pressure rise relay is commonly used to trip the transformer circuit and thus de-energize the transformer to prevent further damage.

B. Description of Prior Art

Mechanical devices for rapid pressure rise detection have been and continue to be a part of the protection practices for electric power transformers. In U.S. Pat. No. 4,074,096, granted on Feb. 14, 1978 in the name of Robert F. Romanowski, a bellows controlled sudden pressure rise relay is described. Other rate sensitive mechanical devices are known. These devices use mechanical components to determine the rate of change of pressure and then operate micro-switches to provide an electrical output. The momentary switch closure is commonly applied to a seal-in relay to maintain the tripped status.

OBJECT OF THE INVENTION

The object of the invention is to provide an electric power transformer with the maximum protection, from further damage caused by an internal fault, by tripping a transformer circuit as quickly as possible. However, faults external to a transformer such as transmission line faults can cause transformer tank pressure to rise due to winding heating and these events should not necessarily trip the transformer circuit. The discrimination between external and internal faults is provided by using a time delay and threshold. Rapid pressure rise relays can be mounted on the transformer in the gas space above the cooling oil or within the oil. The gas space acts as a snubber for pressure changes and, therefore, the response of the relay mounted in the gas space must be faster in order to compensate. The response curves for the mechanical rapid pressure rise relay described by Romanowski are shown in FIG. (6). The key features of these curves are that (1) the relay must not operate for pressure changes of less than 0.22 psi/sec, and certain cardinal points for each curve. These are: for the relay mounted in the gas space the time to operate for a pressure rate of 10 psi/sec is 0.178 sec. For the relay mounted in the oil, the time to operate for a pressure rate of 10 psi/sec is 0.267 sec.

The actual rate of rise of pressure due to external faults is dependent upon the transformer design, power system impedances and some additional factors that are not easily predictable. It is, therefore, desirable to provide a means to adjust the response of the relay after it has been installed. This can be done, through operating experience, by decreasing the response until external faults no longer cause the relay to operate. To facilitate repair and/or replacement of an installed relay, this adjustment should be set in such a manner that a replacement unit will have the same response as the original without the need to repeat the initial experimental process.

It is the object of this invention to provide a means to adjust the response of the relay, after it is installed, in such a fashion that a replacement relay can be easily set up to give the same response as the original relay.

SUMMARY OF THE INVENTION

A method of apparatus is set forth for protecting a liquid filled electric power transformer by providing an electronic signal relay to turn off transformer control circuits under certain conditions of rapidly increasing pressure in the transformer tank.

It can be shown that the relay response curves of FIG. (6) follow the equation $$t = -T\{\ln\left[1 - (dp \text{ Max}/dp/dt)\right]\}$$

where:

T is the time constant of the Time delay circuit.

dp Max is the maximum rate of change of pressure which will not cause relay to operate (0.22 psi/sec)

dp/dt is the rate of pressure change t is the time of operate.

Using the cardinal points and solving for T yields T=8 seconds for the relay mounted in the gas space and 12 seconds for the relay mounted in the oil.

Transformer tank pressure is detected by a pressure transmitter and an electrical signal is generated which is proportional to the pressure. In the preferred embodiment, the pressure transmitter signal is a current proportional to pressure which is converted to a voltage at a receiver. The tank pressure voltage V(P) is then differentiated and becomes a rate-of-change-of-pressure signal V(dp/dt).

The rate-of-change signal is then passed through the time delay circuit whose time constant T is field selectable. This time constant determines relay sensitivity, i.e. a long delay time means less sensitivity and a short delay time means greater sensitivity. The selection of sensitivity from minimum to maximum is done using a calibrated rotary switch. Field replacement of an installed relay is accomplished by selecting the same rotary switch position for the replacement relay. This selection matches the sensitivity of the replacement relay with that of the relay being replaced.

The time delay output Vout is the input to a comparator stage that determines when output relays should be activated. The combined operations of the rapid pressure rise relay components generate the response described in the above equation.

DESCRIPTION OF FIGURES

The invention is described in greater detail in the accompanying drawings, wherein.

DETAILED DESCRIPTION OF THE INVENTION

Figure 1:
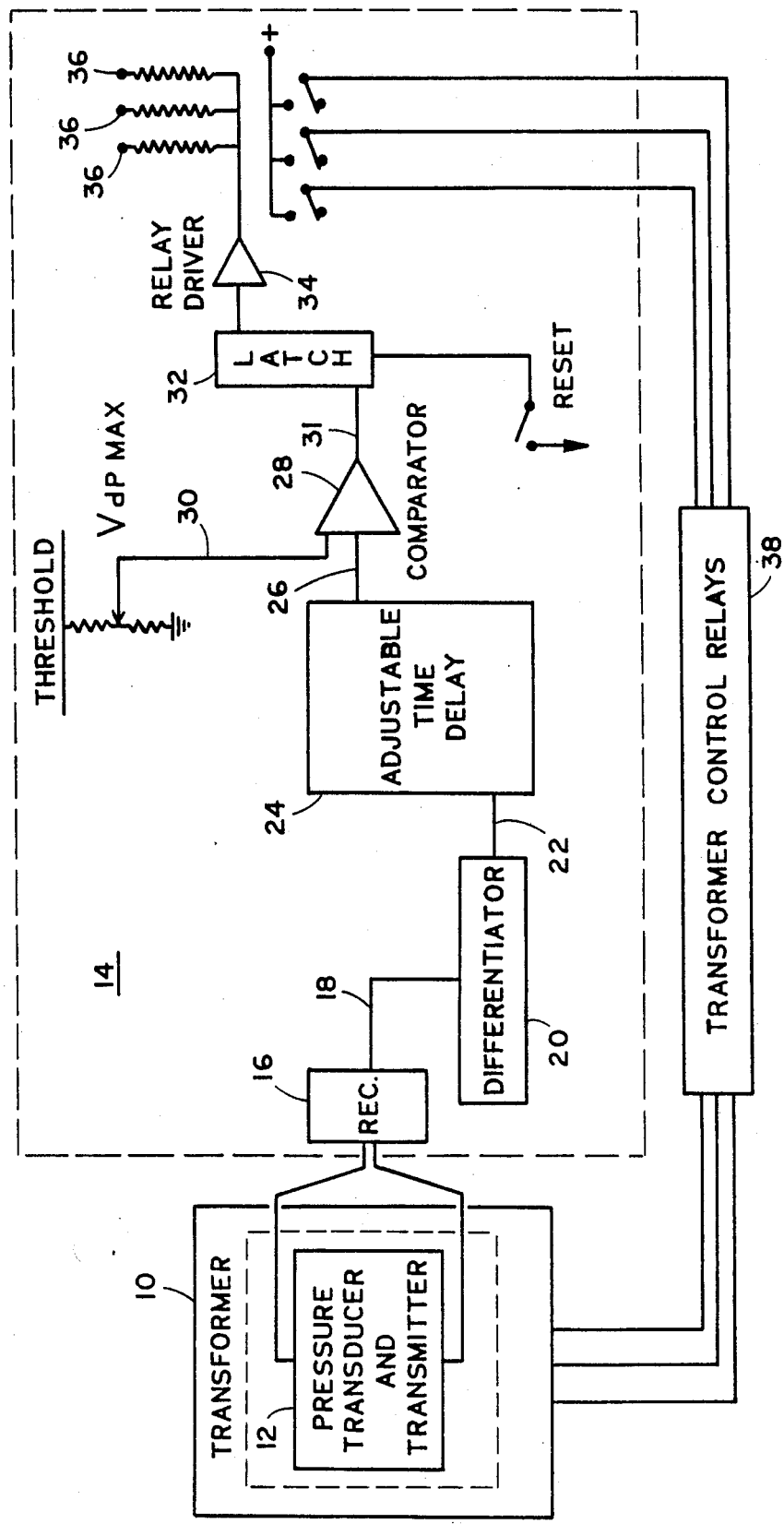
FIG. 1 shows the block diagram of the preferred electronic rapid pressure relay control circuit.

FIG. 1 is the block diagram of the preferred electronic rapid pressure rise relay control circuit. In association with the liquid filled power transformer 10, the main components are the pressure transmitter assembly 12 and the power/control assembly 14. The pressure transmitter 12 converts the internal pressure of the transformer tank to an electrical signal (current) proportional to pressure and transmits this signal to the receiver circuit 16 of the power/control assembly 14. The receiver circuit 16 converts the transmitted pressure signal to a proportional voltage, V(p) on conductor 18. The voltage V(p) is then applied to a differentiator circuit 20 whose output, V(dp/dt), on conductor 22 is a voltage proportional to the rate of change of pressure.

The output of the differentiator 20 is the input to a time delay circuit 24, which provides the required time response. The delay circuit output, Vout, on conductor 26 is then applied to the comparator circuit 28 where it is compared to the threshold voltage VdpMax at 30, which a voltage equivalent to dp Max. VdpMax represents the maximum rate of change of pressure which will not cause the relay to operate. Whenever Vout exceeds VdpMax, the output of the comparator is true. Because the output of the comparator is transient, its output must be latched. The comparator output at 31 is used to set a latch circuit 32 which activates the relay driver 34. The contacts of output relays 36 are used by trip circuits and annunciators. The rapid pressure rise relay is then reset manually or when its supply power is removed.

It is noted that process transmitters and receivers as well as differentiators, time delay circuit, comparators, and electronic latches are all well known to those skilled in the art of electronic design or instrumentation. For instance, the pressure transmitter assembly 12 and subsequent generation and transmission of a signal representative of pressure may be accomplished by the use of the well known fundamentals taught by the following publications. Transducer Interfacing Handbook published by Analog Devices, Inc. 1980, Library of Congress Catalog Card No. 80-65520, Pages 4, 5, 93–95 and 184–187. Standard Handbook for Electrical Engineers, McGraw Hill Book Company 1969, Library of Congress Catalog Card No. 56-6964, Pages 15-49 and 15-50. Electronics Engineers' Handbook, McGraw Hill (c) 1975 Pages 24-5 to 24-11. Circuits for differentiation are well known as evidenced by Electronics Designers' Handbook, second edition, McGraw Hill (c) 1977, Pages 18-23 to 18-25. The slope of a curve fundamentals are treated by the publication Calculus and Analytic Geometry, fourth edition by George B. Thomas, Jr. (c) 1968, Addison Wesley Publishing Company, Library of Congress Catalog Card No. 68-17568, Pages 30 to 35. The principles of RC circuits are discussed in the publication Pulse, Digital, and Switching Waveforms by Jacob Millman and Herbert Taub, McGraw Hill, (c) 1965 Library of Congress Catalog Card No. 64-66293.

Figure 2:
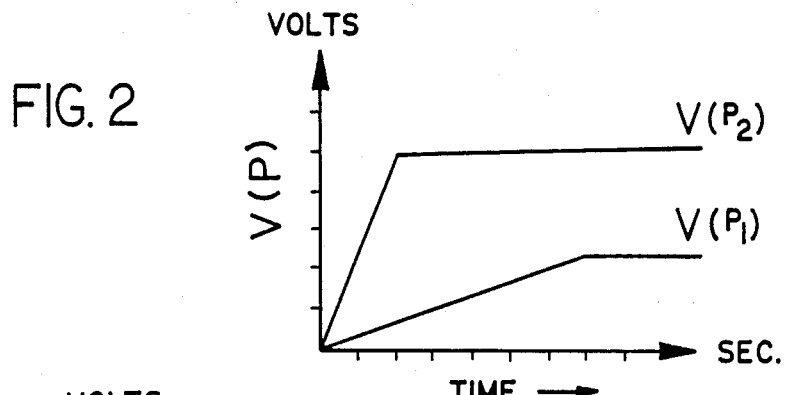
FIGS. 2 and 3 show representative pressure voltages, V(p) and corresponding rate-of-change voltages V(dp/dt)
Figure 3:
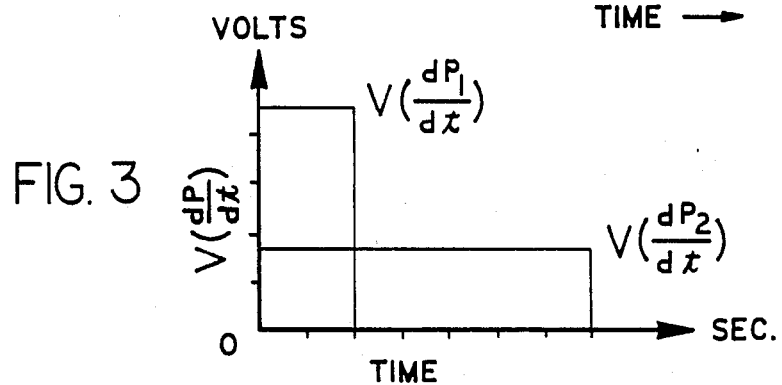

FIG. 3 shows the differentiator output V(dp/dt), for the two different increasing inputs VP (t) of FIG. 2, are voltages with values proportional to the rate of change of the input voltage.

Figure 4:
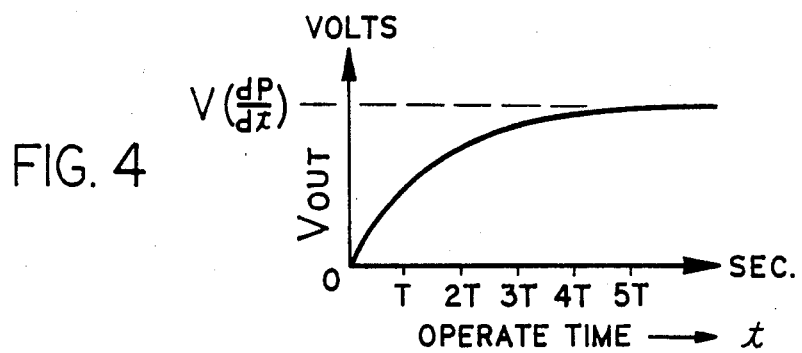
FIGS. 4 and 5 show exponential voltage curves of Vout, generated by the time delay circuit from rate of change voltages, V(dp/dt)
Figure 5:
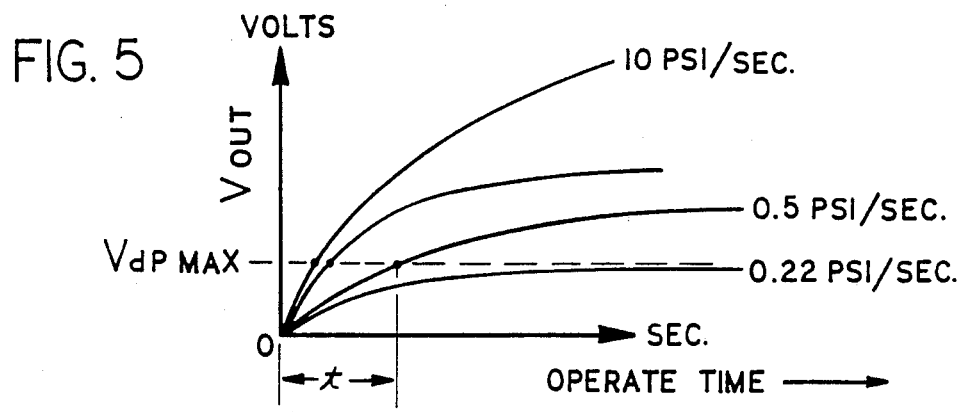

The differentiator output, V(dp/dt), is then applied to time delay circuit. The output of the time delay, Vout, rises exponentially toward the input value, as shown in FIG. 4.

Figure 6:
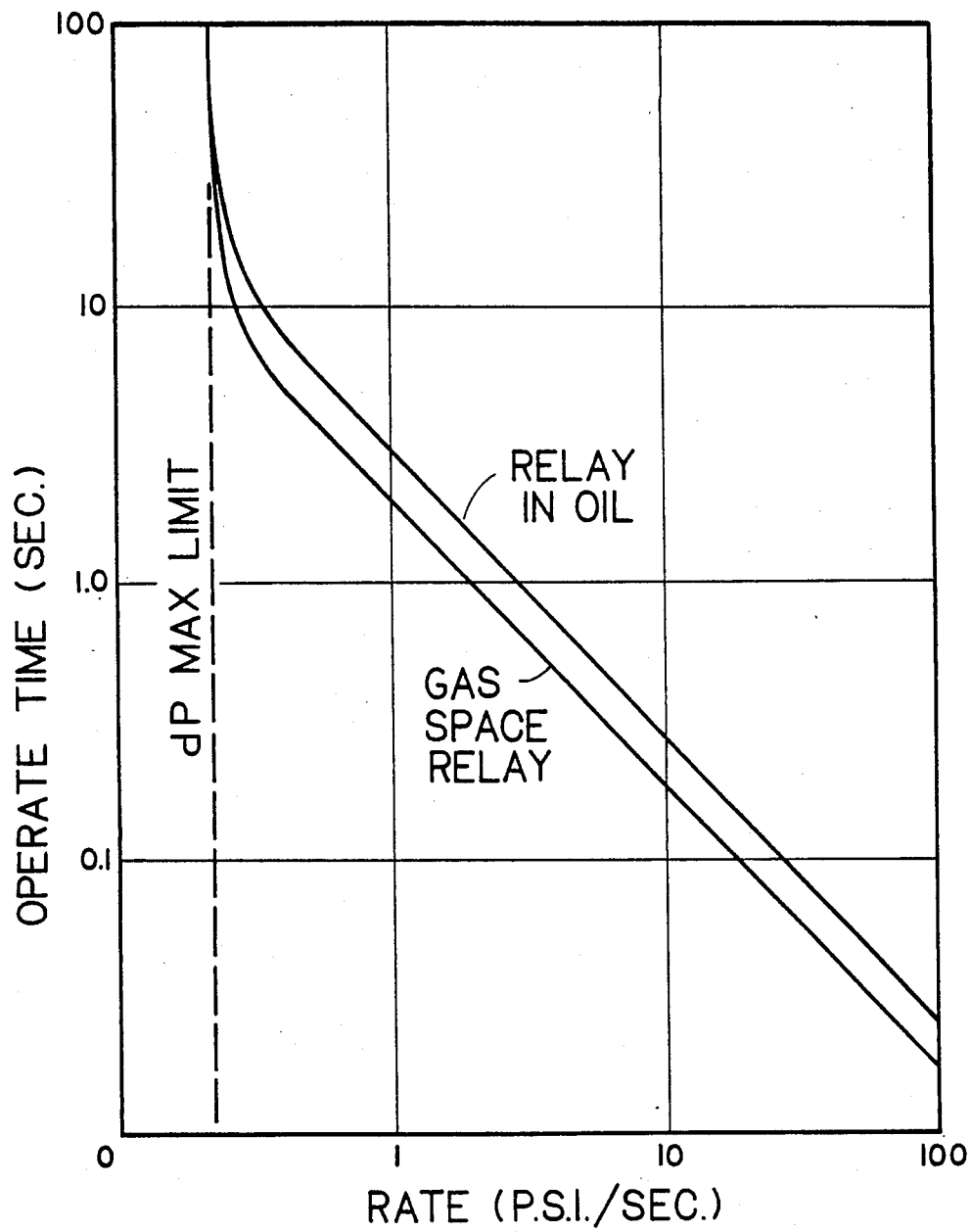
FIG. 6 shows the rate vs. time relationship for representative gas space and oil rapid pressure rise relays.

The relay operate time is determined by how long it takes for Vout to exceed Vdpmax as depicted in FIG. 6.

It is understood that the methods disclosed in this invention could be carried out and performed by digital apparatus.

What is claimed is:

1. Electronic circuit apparatus for controlling the power to an electric power transformer having a liquid filled tank comprising,
    means for measuring the pressure in the transformer tank,
    means for generating an electrical signal proportional to the pressure measured,
    means for differentiating the signal proportional to the pressure measured to generate a signal proportional to the rate of change of transformer tank pressure,
    means for providing a field adjustable time delay of the rate of change signal to generate a time response signal,
    means for generating a maximum rate of change signal, and
    means for comparing the field adjustable time response signal with the maximum rate of change signal, to generate a shut-off signal when the same time response signal exceeds the maximum rate of change signal.

2. The apparatus of claim 1 further comprising means responsive to the shut-off signal to deactivate the power to the transformer.

3. Apparatus for controlling the power to an electric power transformer having a liquid filled tank comprising,
    means for measuring the pressure in the transformer tank,
    means for generating an electrical signal proportional to the pressure measured,
    means for differentiating the signal proportional to the pressure measured to generate a signal proportional to the rate of change of transformer tank pressure,
    means for providing a field adjustable time delay of the rate of change signal to generate a time response signal,
    means for generating a maximum rate of change signal,
    means for comparing the time response signal with the maximum rate of change signal, to generate a shut-off signal when the said time response signal exceeds the maximum rate of change signal,
    latch circuit means to retain the comparator status and shut-off signal until reset or until power is removed,
    relay driver means responsive to the shut-off signal, and
    output relay means responsive to the relay driver to control current to the transformer windings.

4. The method of automatically controlling power to a transformer comprising the steps of:
    measuring the pressure in a liquid filled electric power transformer tank,
    generating a voltage proportional to the tank pressure measured,
    differentiating the tank pressure voltage to generate a voltage signal proportional to the rate of change of tank pressure,
    filtering the rate of change signal to generate a time response signal, and
    comparing the time response signal with the maximum rate of change of pressure signal for which a control relay must not operate to turn off the transformer.

5. The method of claim 4, further comprising the step of activating control relay apparatus to deactivate the transformer when the time response signal is greater than the maximum rate of change of pressure signal.

* * * * *